Patented July 22, 1941

2,250,384

UNITED STATES PATENT OFFICE 2,250,384

LUBRICANT

Bert H. Lincoln and Waldo L. Steiner, Ponca City, and Alfred Henriksen, deceased, late of Ponca City, Okla., by John W. Wolfe, administrator, Ponca City, Okla., assignors, by mesne assignments, to The Lubri-Zol Development Corporation, Cleveland, Ohio, a corporation of Delaware No Drawing. Application October 18, 1939, Serial No. 300,070

12 Claims. (Cl. 252—54)

Our invention relates to lubricating oils and more particularly to improved methods for the production of high quality lubricating oils and such products as new compositions of matter.

This application is a continuation in part of our copending application Ser. No. 733,862, filed July 5, 1934, now Patent No. 2,180,008, issued November 14, 1939.

It is well known among petroleum technologists and mechanical technologists that mineral lubricating oils are deficient in oiliness characteristics and in extreme pressure characteristics, which are the most important characters of the lubricant when used under conditions of boundary lubrication, where the viscosity of the lubricant plays little or no part. Boundary lubrication conditions are obtained when engines are operating at heavy loads, low speeds, or if for any reason the supply of lubricant is cut off or not sufficient. This last condition may exist when for mechanical reasons the lubricant pump is not functioning properly or when the lubricant feed line is clogged with foreign matter. The present-day design of automotive as well as other mechanical devices calls for greater loads on rubbing surfaces and the loads so imposed are too great for mineral lubricating oils. With lubricants of high load carrying capacity, designers of mechanical devices can design for greater loads on rubbing surfaces and obtain pronounced and definite economies in a number of ways.

Extreme pressure lubrication conditions are required for cutting oils and the like and it is well known that mineral lubricants are not satisfactory for this purpose.

The above described conditions are encountered with the very best quality and most highly refined lubricating oils. In some cases the more highly refined lubricants are weaker in extreme pressure characteristics.

The primary object of our invention is to provide lubricants of high oiliness and extreme pressure characteristics which will provide low coefficient of friction and which will allow higher loads on rubbing surfaces during operation and will act as a safety factor in lubrication when abnormal conditions exist for one reason or another.

Another object of our invention is to provide a lubricant which will maintain a very low coefficient of friction and good extreme pressure characteristics when diluted with light hydrocarbons such as are obtained in an automobile crank case by incomplete combustion of the fuel being burned in the engine.

A further object of our invention is to provide a lubricant having penetrative lubricity characteristics. It has been found that our lubricants do not drain off the rubbing surfaces when the parts are idle, thereby providing a lubricating film on the rubbing surfaces at all times and being of great value to the life of the machine in cold weather starting when the lubricant is very viscous and sluggish.

Still another object of our invention is to provide extreme pressure lubricants which may be used in metal cutting, severe lubricating conditions, and the like.

Other objects will appear as the description proceeds.

To the accomplishment of the foregoing and related ends, said invention, then, consists of the means hereinafter fully described and particularly pointed out in the claims.

The following description sets forth in detail certain approved combinations of ingredients embodying our invention, such disclosed means constituting, however, but one of various forms in which the principle of the invention may be used.

Broadly stated, this invention comprises the discovery that the aforementioned desirable qualities may be produced to an unusual degree in a lubricating composition by the incorporation therein of a minor amount of a halogen bearing derivative of catechol including derivatives having groups such as alkyl, aryl, aralkyl, or other open-chain or closed-chain radicals substituted on the catechol ring. The open-chain or closed-chain groups may contain halogen, oxygen, sulfur, nitrogen, phosphorus, a metallic atom, or two or more of these characterizing elements. As examples, one or more of the hydrogen atoms attached to the catechol ring may be replaced by any of the following groups:

| | |
|---|---|
| methyl | acetyl |
| propyl | propenyl |
| hexyl | butyryl |
| lauryl | benzoyl |
| stearyl | paraffin wax radical on a phenyl |
| oleyl | anthranyl |
| petroleum wax radical | |
| phenyl | cyclohexyl |
| toluyl | methylcyclohexyl |
| naphthyl | cetylcyclohexyl |
| stearoyl | |

Radicals of the foregoing character being designated as "R," they may be attached directly to carbon atoms of the catechol ring or through the following characteristic groups:

R—O—  
R=O  
R.N=  
RNH—  
R—S—  
RS—S—  
R₂P—  
R$_n$M—(M=metal)  
R$_n$M—O—  
RS—M—

In addition, the "R's" may be substituted by various groups such as:

O=R—  
H₂N—R—  
RNHR—  
O=N—R—  
R—S—R—  
HS—R—  
RS(=O)—R—  
R—S—S—R—  
R₂P—R—  
H₂P—R—  
RHP—R—  
(RO)₂P(=O)O—R—  
(RO)₂P(=S)OR—  
SNC—R—  
R$_n$M—R—

In addition to the above, various inorganic acid radicals of acids of nitrogen, sulfur, phosphorus, and the like may be attached to the catechol radical or to the substituent radical on the catechol ring.

We have found that a remarkable increase in film strength may be obtained by following the teachings of this invention, 1% of dichlor catechol in an S. A. E. 30 lubricant giving a film strength of 51,000 pounds per square inch on the Timken testing machine. Among attendant advantages is the fact that this addition agent, while so effective in increasing the film strength of the lubricant in which it is incorporated, will not cause the corrosion of various metals and alloys now commonly employed as bearing metals. It has also been found that a lubricant compounded in accordance with the present invention will consistently maintain a low coefficient of friction over extended periods of use and that sufficient will adhere to the working parts to protect the same during the starting operation even in cold weather when the main body of the lubricant is viscous and sluggish.

While amounts of the addition agent from about 0.1% to about 20% by weight of the total composition may be employed it is one of the advantages of the halogen bearing catechols that but small amounts need be employed to obtain very great improvement of extreme pressure characteristics and from 1% to 5% is generally amply sufficient.

Among other examples of effective addition agents may be mentioned chlorinated iso-butyl catechol and chlorinated iso-amyl catechol, specifically the di-chlor derivatives.

The degree of halogen content may vary over wide limits, as from about 5 per cent by weight to as much as 60 per cent by weight, or more.

All of the various halogens are effective when employed in accordance with the present invention but chlorine is generally preferred inasmuch as it is the least expensive and one of the most effective of the halogens. Bromine and fluorine are more expensive and the latter somewhat more difficult to handle but they are each usable in accordance with this invention. Iodine is not so readily obtainable as the other halogens and is quite expensive but it is also satisfactory in providing effective addition agents.

When used in conjunction with a mineral lubricating oil it is obvious that generally only such amounts of the addition agent may be included as are soluble in the specified amount of oil. By the term "soluble" as herein used it is intended to indicate the ability to form not only true solutions but also any form of substantially permanently homogeneous composition when incorporated in mineral oil. Since quite small percentages often give remarkably improved results it is seldom of extreme importance that the addition agents be oil-soluble in all proportions.

It is also obvious that for certain uses the addition agent must be sufficiently stable so that undue corrosion does not take place although for other uses, as in cutting oils and the like, such stability is not necessary or generally desired.

The base oil employed in the compositions of this invention is generally mineral oil, but it is to be understood that any other suitable hydrocarbon lubricating oil, whether natural or synthetic, and including hydrogenated and voltolized oils, may be employed as the oil base.

It is also within the contemplation of this invention to provide the addition agents in the form of a concentrate in a suitable oil, said oil containing rather high percentages of the addition agents. Such concentrates may be employed for future blending with a lubricating oil in the proportions desired for the particular conditions of use.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. A lubricating composition comprising a major proportion of lubricating oil and a minor amount of a halogen bearing derivative of catechol the hydroxyl groups of the catechol nucleus being unblocked.

2. A lubricating composition comprising a major proportion of lubricating oil and from about 0.1% to about 20%, based on the amount of oil, of a halogen bearing derivative of catechol the hydroxyl groups of the catechol nucleus being unblocked.

3. A lubricating composition comprising a major proportion of lubricating oil and a minor amount of a chlorine bearing derivative of catechol the hydroxyl groups of the catechol nucleus being unblocked.

4. A lubricating composition comprising a major proportion of lubricating oil and from about 1% to about 5%, based on the amount of lubricating oil, of a chlorine bearing derivative of catechol the hydroxyl groups of the catechol nucleus being unblocked.

5. A lubricating composition comprising a major proportion of lubricating oil and a minor amount of dichlor catechol.

6. A lubricating composition comprising a major proportion of lubricating oil and about 1% of dichlor catechol.

7. A lubricating composition comprising a major proportion of lubricating oil and from about 0.1% to about 20%, based on the amount of oil, of dichlor catechol.

8. A lubricating composition comprising a major proportion of lubricating oil and from about 1% to about 5%, based on the amount of lubricating oil, of dichlor catechol.

9. A lubricating composition comprising a major proportion of lubricating oil and a minor amount of a halogen bearing catechol the hydroxyl groups of the catechol nucleus being unblocked.

10. A lubricating composition comprising a major proportion of lubricating oil and from about 0.1% to about 20%, based on the amount of oil, of a halogen bearing catechol the hydroxyl groups of the catechol nucleus being unblocked.

11. A lubricating composition comprising a major proportion of lubricating oil and a minor amount of a chlorine bearing catechl the hydroxyl groups of the catechol nucleus being unblocked.

12. A lubricating composition comprising a major proportion of lubricating oil and from about 1% to about 5%, based on the amount of lubricating oil, of a chlorine bearing catechol the hydroxyl groups of the catechol nucleus being unblocked.

BERT H. LINCOLN,
WALDO L. STEINER,
JOHN W. WOLFE,
*Administrator de bonis non of the Estate of Alfred Henriksen, Deceased.*